3,084,607
IRIS TYPE SHUTTER

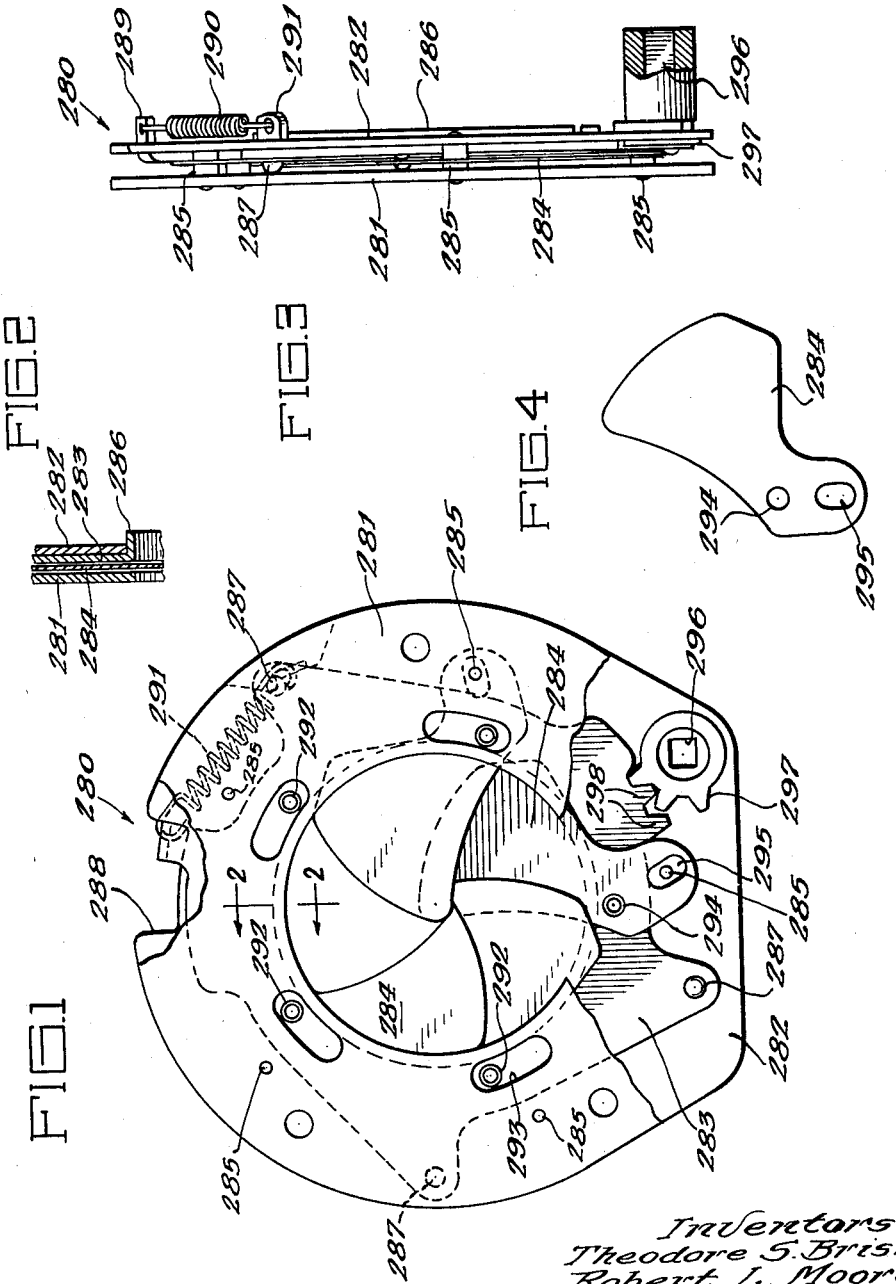

Theodore S. Briskin, Chicago, Robert L. Moore, La Grange Highlands, and Rudolph A. Rom, Stickney, Ill., assignors, by mesne assignments, to Revere Camera Company, a corporation of Delaware Original application Mar. 21, 1955, Ser. No. 495,474, now Patent No. 2,968,993, dated Jan. 24, 1961. Divided and this application May 13, 1960, Ser. No. 29,057

4 Claims. (Cl. 95—63)

This invention relates to an improved construction for an iris type shutter or stop and is a division of our copending application, Serial No. 495,474, filed March 21, 1955, now Patent No. 2,968,993.

The shutter construction shown herein is particularly well adapted for use in a slide projector of the type shown in the above application for the reason that it can be incorporated as a part of a slidably mounted lens unit.

It is an object of this invention to provide a shutter construction which comprises a self-contained unit in the form of two plates which are secured to each other in spaced relationship by means of rivets, and in which the iris blades and actuating mechanism are located in a protected position between said two plates.

A further object is to provide a shutter mechanism which requires the use of no fastening means during assembly other than the spacer rivets for the plates.

Another object is to provide a shutter in construction which is actuated by means of rotatable sleeve so that the shutter assembly may be slidably mounted with respect to an actuating shaft having a splined connection with the sleeve.

Other objects, features and advantages will become apparent as the description proceeds.

With reference now to the drawings in which like reference numerals designate like parts:

FIG. 1 is an elevation of a preferred embodiment of our invention;

FIG. 2 is an enlarged detailed vertical section taken along line 2—2 of FIG. 1;

FIG. 3 is an end view of FIG. 1; and

FIG. 4 is a detailed view showing one of the shutter blades.

The shutter assembly is shown in FIGS. 1 to 4 and comprises an apertured front plate 281, an apertured rear plate 282, an actuating ring 283, and a plurality of shutter blades 284. Shoulder rivets 285 are mounted in the rear plate 282 and provide means for securing the two plates to each other in spaced relationship. The actuating ring 283 is rotatably mounted with respect to the other elements, and this relationship is provided by means of an extruded edge 286, shown in FIG. 2, which is formed on the inner edge of the ring. The ring 283 is mounted immediately adjacent the rear plate 282, and the extruded edge 286 rides on the inner edge of the rear plate. Three or more extruded spacer knobs 287 are formed on the ring 283 and project toward the front plate 281 and serve to avoid excess play of the parts in the axial direction.

A notch 288 is formed in the rear plate, and a bent-over lug 289 on the ring 283 extends rearwardly through the notch, the width of the notch serving to limit the rotational movement of the actuating ring 283. A spring 290 extends between the lug 289 and a lug 291 which is formed on the rear plate 282 so that the ring is biased in the clockwise direction, as viewed in FIG. 1, which corresponds to shutter closed position.

The ring 283 is provided with a plurality of extruded pivots 292, which serve as shiftable pivots for the shutter blades 284. The front plate 281 is provided with arcuate slots 293 to accommodate the pivots 292.

Each shutter blade 282, as shown in FIG. 4 is provided with a hole 294 which fits over one of the shiftable pivots 292, and is also provided with a slot 295 which fits over the spacer rivets 285. Thus, as the actuating ring 283 is shifted, each one of the shutter blades will be caused to move from shutter closed position into shutter open position, or vice-versa. In the shutter open position, the blades are wholly retracted into the space between the ring 283 and front plate 281, and as pointed out above, the extruded spacer knobs 287 maintain the required spacing.

The ring 283 is actuated by means of a sleeve 296, having a square hole, which is rotatably journaled in the rear plate 282, and projects rearwardly therefrom. Secured to the sleeve 296 and rotating therewith, but located on the front side of the rear plate is a partial pinion 297 which meshes with rack teeth 298 formed on the ring 283. Thus, rotation of the sleeve causes operation of the shutter.

The sleeve arrangement permits the shutter to be slidably mounted with respect to a suitable actuating shaft (not shown) of square cross section.

Although preferred embodiments of the present invention have been described herein, it will be understood that various modifications and changes may be made in the construction shown without departing from the scope of the invention as pointed out in the appended claims.

We claim:

1. Shutter means for a slide projector and adapted for slidable mounting with respect to an actuating member comprising a front plate, a rear plate, means to maintain said plates in spaced relationship, an actuating ring disposed between said plates, said plates and said ring being provided with central apertures, said ring having an extruded inner edge portion engaging the inner edge portion of one of said plates whereby said ring may be rotatably mounted on said plate and having a plurality of spacers engaging the other of said plates and serve to maintain said extruded inner edge portion in engagement with the inner edge portion of said first mentioned plate, a plurality of pairs of pivot means, one pivot means of each pair being mounted on said actuating ring, and the other pivot means of each pair being mounted on one of said plates, a plurality of shutter blades, each being mounted on both of said pivots, whereby rotation of said actuating ring will cause said shutter to be projected from a retracted position in which they are wholly received between said plates, into an operated position in which they extend into said central aperture, a sleeve journaled in one of said plates, and having a non-circular opening for receiving an actuating member in sliding relationship, pinion means carried by said sleeve, and a rack formed on said actuating ring and meshing with said pinion means, whereby rotation of said sleeve will cause actuation of said shutter.

2. Shutter means for a slide projector comprising a front plate, a rear plate, means to maintain said plates in spaced relationship, an actuating ring disposed between said plates, said plates and said ring being provided with central apertures, said ring having an extruded inner edge portion engaging the inner edge portion of one of said plates whereby said ring may be rotatably mounted on said plate and having rounded extrusions formed therein which bear against the other of said plates to provide bearing surfaces for accommodating the rotation of said ring, a plurality of pairs of pivot means, one pivot means of each pair being mounted on said actuating ring to provide a shiftable pivot means, and the other pivot means of each pair being mounted on one of said plates to provide stationary pivot means, and a plurality of shutter blades located between said ring and said second mentioned plate, said rounded extrusions maintaining a clearance to accommodate said blades, each being mounted on both of said pivots, whereby rotation of said actuating ring will cause said shutter to be projected from a retracted position in which they are wholly received between said plates, into an operated position in which they extend into said central aperture.

3. Shutter means as claimed in claim 2 in which said means to maintain said plates in spaced relationship comprise shoulder rivets, said shoulder rivets constituting said stationary pivot means.

4. Shutter means for a slide projector comprising annular front and rear plates, means to maintain said plates in spaced relationship, an actuating ring disposed between said plates, said ring having an extruded inner edge portion engaging the inner edge portion of one of said plates whereby said ring may be rotatably mounted on said one plate, and a plurality of shutter blades located between said plates and actuated by rotation of said actuating ring, said ring being provided with a plurality of spacers engaging the other of said plates and serving to maintain said extruded inner edge portion in engagement with the inner edge portion of said first mentioned plate, said spacers providing a clearance between said ring and said second mentioned plate, said blades being located between said ring and said second mentioned plate, and said spacers being rounded extrusions formed in said ring to provide bearing surfaces to accommodate the rotation of said ring.

References Cited in the file of this patent

UNITED STATES PATENTS

| | | |
|---|---|---|
| 532,327 | Levy | Jan. 8, 1895 |
| 761,756 | Brueck | June 7, 1904 |
| 798,595 | Brueck | Sept. 5, 1905 |
| 844,854 | Dietz | Feb. 19, 1907 |
| 975,464 | Schmid | Nov. 15, 1910 |
| 1,215,284 | Klein | Feb. 6, 1917 |
| 1,488,896 | Riddell | Apr. 1, 1924 |
| 1,612,745 | Riddell | Dec. 28, 1926 |